:::page
United States Patent Office 3,792,107
Patented Feb. 12, 1974

---

3,792,107
PROCESS FOR DISPROPORTIONATING THE OLEFINS
Vittorio Fattore, S. Donato Milanese, Marcello Mazzei, Milan, and Bruno Notari, S. Donato Milanese, Italy, assignors to Snam Progetti, S.p.A., S. Donato Milanese, Italy
No Drawing. Filed July 21, 1971, Ser. No. 164,916
Claims priority, application Italy, July 29, 1970, 28,016/70
Int. Cl. C07c 3/62
U.S. Cl. 260—683 D      11 Claims

ABSTRACT OF THE DISCLOSURE

A process is disclosed for disproportionating an olefin having from 3 to 30 carbon atoms, wherein the olefin is contacted with a catalyst consisting essentially of an oxide of tungsten and copper or of tungsten and a metal of the 8th group of the periodic system, preferably iron, cobalt or nickel, in which the ratio of metal to tungsten is in the range of 1:3 to 5:1. The catalyst is advantageously supported by a carrier such as silica and its contact with the olefin is effected at a temperature in the range of 400 to 700° C., at a pressure in the range of 1 to 50 atmospheres and for a contact time in the range of 0.1 to 60 seconds.

---

The present invention relates to a process for disproportionating the olefins. More particularly the present invention relates to a process for disproportionating the olefins by means of particular catalysts.

It is known to disproportionate the olefins so that linear olefins are changed into the homologous ones having both a higher carbon atom number and a lower carbon atom than the starting olefin.

Disproportionating processes are also known according to which use is made of suitable catalyst systems, molecular hydrogen being present or absent. However, the known catalysts have the great disadvantage of the intense sensitivity to the poisons and, therefore, of a very short life.

A starting activation is also carried out in order to optimize the services, it being based on peculiar techniques, very difficult and often very expensive, which remarkably influence the course and the cost of the process. For example, the known catalysts have to be heated at high temperature in presence of air, an inert gas or a reducing gas.

Another drawback one may meet by employing the known catalyst systems consists of the several regenerations and activations following the starting activation. This fact is absolutely necessary because of the very fast decline of the activity optimum owing to the very high amount of carbon forming during the process course. The regeneration is generally carried out at a temperature higher than the working one and, therefore, does not allow a continuous running of the process. If then the disproportionating reaction is carried out in presence of molecular hydrogen, a very high percentage of the formed olefins is hydrogenated to the corresponding saturated compounds.

It has now been found, which is the object of the present invention, that the olefins may be disproportionated at high conversion and selectivity by employing particular catalysts based on tungsten, copper or metals of the 8th group of the Periodic Table oxides, and particularly based on the aforesaid metals tungstate. Some other oxides may be present or absent.

The use of these catalyst systems has very large advantages with respect to the known ones. In fact, it does not require any starting activation or following activation; it may be employed without being regenerated up to 90 hours, the final carbon deposit being lower than 25%. After this, a simple regeneration in presence of air at working temperature completely restores the starting activity. Moreover it drastically lowers the time necessary to reach the best obtainable conversion.

The catalysts according to the present invention moreover present a very high working uniformity, from the lowest to the highest percentages of activated part. Another advantage consists of a higher resistance to the poisons.

According to the process of the present invention the olefins are disproportionated when being contacted by a catalyst essentially consisting of tungsten and copper oxides or of tungsten and metals of the 8th of the Periodic Table oxides, particularly of tungstates of same, some other oxides being present or absent, the catalysts being preferably supported, at a Me/W ratio ranging from 1:3 to 5:1, Me being copper or a metal of the 8th group of the periodic system, preferably selected among iron, cobalt and nickel. It has been shown that, in the said range, the amount of copper or other metals increasing lowers the reaction induction time and increases the resistance to the poisons.

The preferred carrier is the silica; however, use may be made of other carriers as alumina, silica-alumina, Kieselguhr and the like. The reaction may be applied to single olefins or to mixtures of the olefins having a carbon atom number between 3 and 30, preferably between 3 and 12. For example, it is possible to disproportionate olefins selected from propylene, 1-butene, isobutene, 1-pentene, 2-pentene, 1-hexene, 2-heptene, 3-heptene, 1-octene, 2-nonene, 1-dodecene, 1-hexadecene, 2-methyl-1-butene, 2-methyl-2-butene, 3-methyl-1-butene, 1-phenyl-butene-2 and 3-eicosene. The catalyst of the inventive process may be obtained by inserting into the aforesaid carriers suitable compounds of copper or of the 8th group metals and tungsten according to the usual methods, for example by impregnation, by coprecipitating or by atomization. The catalyst may be employed having the shape of dust, granules, films, little spheres or any shape suitable to the employed contact technique.

The disproportionating process of the olefins is carried out at a temperature ranging between 400 and 700° C., preferably between 450 and 600° C., and at a pressure ranging between 1 and 50 atmospheres; the disproportionating reaction may be carried out by a continuous or a discontinuous flow system in a fixed or a moving bed, or by means of some other contact method known to the skilled in the art; and the contact time is selected with respect to the working conditions, which contact time is the ratio between the volume of the catalyst bed and the flow rate of the reactants as gases in the reaction conditions, long contact times being generally avoided in order to prevent secondary reactions from happening, so use will be made of contact times ranging between 0.1 and 60 seconds.

Some other working characteristics will be pointed out by the following unrestrictive examples hereinafter reported to illustrate the invention. In all examples, the terms selectivity and conversion have the following meanings:

$$\text{Conversion} = \frac{\text{moles of entering olefins} - \text{moles of emerging olefins}}{\text{moles of entering olefins}} \cdot 100$$

$$\text{Selectivity} = \frac{\text{Percent by weight of the product}}{\text{Percent by weight of the converted olefin}} \cdot 100$$

EXAMPLE 1

Propylene was disproportionated in the presence of a catalyst consisting of Co tungstate on silica as catalyst carrier, the percentage of the activated part being of 40% and the Co/W atomic ratio of 2:3. The catalyst was obtained as follows: 17.4 g. of $Co(NO_3)_2 \cdot 6H_2O$ were dissolved in 15 cc. of $H_2O$. On other side, a solution was prepared containing 23.4 g. of $$5(NH_4)_2O \cdot 12WO_3 \cdot 5H_2O$$

in 30 cc. of 3% $H_2O_2$. The two solutions were mixed and kept under stirring in order to facilitate the forming of the Co-tungstate. 100 g. of silica "Ludox" sol AS–30 (30% of silica) were added and the suspension was stirred up to homogeneity. The suspension, always under stirring, was dried on a heating plate at 120° C., then calcined at 550° C. for 4 hours and slowly cooled. A fraction having a 45+75 mesh granulometry was utilized to carry out the disproportionating reaction. 30 cc./min. of propylene were sent on this catalyst at 550° C. and at atmospheric pressure. The obtained results are reported on Table 1.

TABLE 1

| Time as hours | 3.00 | 5.00 | 5¾ | 8½ | 14½ | 16.00 |
|---|---|---|---|---|---|---|
| Analysis of the products as percent by weight: | | | | | | |
| $C_2H_4$ | 11.6 | 15.7 | 16.4 | 17.7 | 18.1 | 18.2 |
| $C_3H_8$ | 0.9 | 0.9 | 1.0 | 1.0 | 0.9 | 0.9 |
| $C_3H_6$ | 69.2 | 58.6 | 57.5 | 54.7 | 54.1 | 53.9 |
| 1 $C_4H_8$ | 3.7 | 4.7 | 4.7 | 4.7 | 4.2 | 4.1 |
| 2 $C_4H_8$ trans | 7.9 | 10.5 | 10.8 | 10.8 | 11.9 | 11.9 |
| 2 $C_4H_8$ cis | 6.4 | 8.4 | 8.7 | 8.7 | 9.4 | 9.5 |
| $C_5H_{10}$ and higher | 0.3 | 1.2 | 0.9 | 0.9 | 1.4 | 1.5 |
| Percent conversion | 30.0 | 40.6 | 41.6 | 44.4 | 45.1 | 45.2 |
| Selectivity at $C_2H_4$ and at $C_4H_8$ | 98 | 97 | 98 | 95 | 97 | 98 |

EXAMPLE 2

The disproportionating reaction of propylene was carried out using a catalyst based on Ni-tungstate on silica as catalyst carrier, at 40% of activated part and at a Ni/W atomic ratio of 2:3. The catalyst was obtained according to the preceding example starting from 17.4 g. of $Ni(NO_3)_2 \cdot 6H_2O$, 23.4 g. of $5(NH_4)_2O \cdot 12WO_3 \cdot 5H_2O$ and 100 g. of silica "Ludox" sol AS–30.

In Table 2 there are reported the weight percentages of the products obtained by disproportionating propylene at 550° C., at atmospheric pressure and at a flow of 30 cc./min.

TABLE 2

| | Percent by weight |
|---|---|
| $C_2H_4$ | 15.9 |
| $C_3H_8$ | 1.2 |
| $C_3H_6$ | 58.7 |
| $1C_4H_8$ | 2.9 |
| $2C_4H_8$ trans | 11.3 |
| $2C_4H_8$ cis | 8.7 |
| $C_5H_{10}$ and higher olefins | 1.2 |
| Percent disproportionate | 40.5 |
| Selectivity for $C_2H_4$ and $C_4H_8$ | 96 |

EXAMPLE 3

The employed catalyst consisted of Fe-tungstate on silica as catalyst carrier, at 40% of activated part, at a Fe/W atomic ratio of 2:3 and at the particles sizes ranging between 45 and 70 mesh. The catalyst was obtained starting from 23.4 g. of $Fe(NO_3)_3 \cdot 9H_2O$, 23.6 g. of $5(NH_4)_2O \cdot 12WO_3 \cdot 5H_2O$ and 100 g. of silica "Ludox" sol of the AS–30 type. The reaction was carried out on 0.9 g. of catalyst at 550° C., at atmospheric pressure and a propylene flow of 30 cc./min. The analysis of the gases coming out from the reactor are reported in Table 3, being expressed as percent by weight.

TABLE 3

| Time as hours | ½ | 3.00 | 3½ | 5½ | 13½ |
|---|---|---|---|---|---|
| $C_2H_4$ | 2.5 | 12.4 | 14.0 | 15.1 | 15.7 |
| $C_3H_8$ | 1.3 | 1.3 | 1.3 | 1.3 | 1.1 |
| $C_3H_6$ | 92.0 | 65.2 | 63.8 | 58.8 | 56.3 |
| 1 $C_4H_8$ | 0.4 | 1.5 | 1.2 | 1.7 | 1.2 |
| 2 $C_4H_8$ trans | 1.9 | 11.0 | 10.5 | 12.9 | 14.2 |
| 2 $C_4H_8$ cis | 1.7 | 8.6 | 9.0 | 10.1 | 10.7 |
| $C_5H_{10}$ and higher olefins | | | | | 0.7 |
| Percent conversion | 7.2 | 34.0 | 35.4 | 40.3 | 42.8 |
| Selectivity for $C_2H_4$ and $C_4H_8$ | 91 | 98 | 98 | 99 | 98 |

EXAMPLE 4

The disproportionating reaction of propylene was carried out using a catalyst based on Fe-tungstate on silica as catalyst carrier, at 40% of activated part, at a Fe/W atomic ratio of 1:1, the particle sizes ranging between 45 and 70 mesh, obtained according to the preceding example, starting from 39.6 g. of $Fe(NO_3)_3 \cdot 9H_2O$, 25.7 g. of $5(NH_4)_2O \cdot 12WO_3 \cdot 5H_2O$ and 75 g. of silica "Ludox" sol of the AS–40 type. Propylene was sent on 0.8 g. of catalyst at a flow of 30 cc./min., at 550° C. and atmospheric pressure. In Table 4 there are reported the weight percentages of the products coming out of the reactor.

TABLE 4

| Time as hours | 3.00 | 6.00 | 22.00 | 23.45 |
|---|---|---|---|---|
| $C_2H_4$ | 10.1 | 17.2 | 16.8 | 16.4 |
| $C_3H_8$ | 0.6 | 0.7 | 0.6 | 0.5 |
| $C_3H_6$ | 72.2 | 54.7 | 54.4 | 55.1 |
| 1 $C_4H_8$ | 2.2 | 1.9 | 2.4 | 1.7 |
| 2 $C_4H_8$ trans | 7.8 | 13.3 | 13.6 | 14.1 |
| 2 $C_4H_8$ cis | 6.6 | 10.2 | 10.5 | 11.0 |
| $C_5H_{10}$ and higher olefins | 0.4 | 1.7 | 1.6 | 1.1 |
| Percent conversion | 27.0 | 44.5 | 44.8 | 44.1 |

EXAMPLE 5

The test was carried out on the same catalyst of Example 4 pretreated by CO at 550° C. for 14 hours. Propylene was disproportionated on 0.8 g. of this catalyst in the same working conditions of Example 4. The results obtained, expressed as weight percentages, are reported in Table 5.

TABLE 5

| Time as hours | 2.50 | 4.00 | 5.20 | 6.20 | 21.45 |
|---|---|---|---|---|---|
| $C_2H_4$ | 11.0 | 13.8 | 15.1 | 15.6 | 16.4 |
| $C_3H_8$ | 0.3 | 0.7 | 0.9 | 0.9 | 0.7 |
| $C_3H_6$ | 68.9 | 63.8 | 57.2 | 56.1 | 54.5 |
| 1 $C_4H_8$ | 1.8 | 1.5 | 2.7 | 2.6 | 1.6 |
| 2 $C_4H_8$ trans | 9.6 | 11.0 | 12.8 | 13.3 | 15.2 |
| 2 $C_4H_8$ cis | 7.9 | 8.6 | 10.5 | 10.9 | 11.2 |
| Percent conversion | 30.2 | 36.4 | 42.0 | 43.1 | 44.7 |

By comparing these data with the ones of the preceding example it is possible to note that pretreating with CO does not influence the performance of these catalysts.

EXAMPLE 6

Propylene was disproportionated in presence of a catalyst consisting of Cu-tungstate on silica as catalyst carrier, at 40% of activated part and a Cu/W atomic ratio of 1:1. The catalyst was obtained in the same way as the catalyst of the preceding examples.

For preparing the catalyst, use was made of 19.6 g. of $Cu(NO_3)_2 \cdot 3H_2O$, 21 g. of $5(NH_4)_2O \cdot 12WO_3 \cdot 5H_2O$ and 100 g. of silica "Ludox" AS–30. Use was made of 0.9 g. of samples having a granulometry tanging between 45 and 70 mesh at a temperature of 550° C., atmospheric pressure and a propylene flow of 30 cc./min. The results, as weight percentages, are reported on Table 6.

TABLE 6

| Time as hours | 2½ | 3.50 | 4¾ | 20.0 | 23.00 | 26.00 | 51.00 |
|---|---|---|---|---|---|---|---|
| $C_2H_4$ | 4.3 | 8.7 | 11.6 | 19.0 | 18.9 | 18.7 | 17.5 |
| $C_3H_8$ | 0.4 | 0.4 | 0.5 | 0.5 | 0.5 | 0.5 | 0.6 |
| $C_3H_6$ | 87.7 | 75.7 | 68.1 | 50.6 | 50.7 | 50.7 | 53.0 |
| 1 $C_4H_8$ | 1.6 | 3.4 | 4.6 | 6.8 | 6.7 | 6.3 | 4.0 |
| 2 $C_4H_8$ trans | 3.1 | 6.1 | 7.7 | 10.3 | 10.5 | 10.6 | 12.0 |
| 2 $C_4H_8$ cis | 2.5 | 4.8 | 6.1 | 7.9 | 7.9 | 8.1 | 9.5 |
| $C_5H_{10}$ and higher olefins | | 0.6 | 1.1 | 4.7 | 4.5 | 4.9 | 2.9 |
| Percent conversion | 11.5 | 23.5 | 31.0 | 48.5 | 48.4 | 48.5 | 46.2 |
| Selectivity for $C_2H_4$ and $C_4H_8$ | 99 | 98 | 97 | 91 | 91 | 90 | 93 |

EXAMPLE 7

It relates to a test carried out on 0.9 g. of the same catalyst of Example 6. The disproportionating reaction was carried out by feeding hydrated propylene, at atmospheric pressure, at 550° C. and a propylene flow rate of 30 cc./min. The results obtained as weight percentages, are reported in Table 7.

TABLE 7

| Time as hours | 1½ | 5.00 | 23.00 | 28½ | 47½ | 73½ | 95.00 |
|---|---|---|---|---|---|---|---|
| $C_2H_4$ | 5.3 | 7.1 | 11.1 | 13.8 | 13.6 | 14.2 | 7.6 |
| $C_3H_8$ | 1.4 | 1.7 | | | | | 2.1 |
| $C_3H_6$ | 81.0 | 75.9 | 68.1 | 61.4 | 61.7 | 60.1 | 62.9 |
| 1 $C_4H_8$ | 2.9 | 3.5 | 4.7 | 5.3 | 4.9 | 4.1 | 3.3 |
| 2 $C_4H_8$ trans | 4.2 | 5.2 | 6.7 | 8.0 | 8.2 | 8.8 | 9.2 |
| 2 $C_4H_8$ cis | 5.1 | 6.4 | 8.4 | 10.0 | 10.1 | 16.2 | 13.7 |
| $C_5H_{10}$ and higher olefins | | 0.2 | 0.9 | 1.6 | 1.5 | 1.6 | 1.1 |
| Percent conversion | 18.1 | 23.2 | 31.1 | 37.8 | 37.5 | 39.1 | 36.3 |
| Slectivity for $C_2H_4$ and $C_4H_8$ | 97 | 96 | 99 | 98 | 98 | 98 | 93 |

In Table 8 there are reported, for comparison, the data obtained in the same experimental conditions, by working on a catalyst based on $WO_3$ on silica as catalyst carrier at 7.6% of activated part and obtained as follows: a solution of 5.6 g. of $5(NH_4)_2O \cdot 12WO_3 \cdot 5H_2O$ in 15 cc. of 3% $H_2O_2$ was added to 160 g. of silica "Ludox" sol of the AS–30 type. The resulting suspension was dried, under stirring, on a heating plate at 120° C., then calcined at 550° C. for 4 hours and slowly cooled. For the disproportionating reaction a fraction was recovered having a granulometry ranging between 45 and 70 mesh.

TABLE 8

| Time as hours | ½ | 2.00 | 5½ | 7.00 | 7½ | 23.00 |
|---|---|---|---|---|---|---|
| $C_2H_4$ | 1.0 | 4.5 | 6.5 | 6.7 | 6.6 | 4.7 |
| $C_3H_8$ | 0.1 | 0.3 | 0.4 | 0.4 | 0.4 | 0.4 |
| $C_3H_6$ | 94.4 | 87.1 | 81.7 | 81.0 | 81.5 | 86.2 |
| 1 $C_4H_8$ | 0.2 | 0.3 | 0.5 | 0.5 | 0.5 | 0.5 |
| 2 $C_4H_8$ trans | 2.2 | 4.0 | 5.6 | 5.8 | 5.7 | 4.5 |
| 2 $C_4H_8$ cis | 2.0 | 3.6 | 5.0 | 5.2 | 5.1 | 3.4 |
| 5 conversion | 4.8 | 12.1 | 17.4 | 18.2 | 17.7 | 12.9 |

The comparison of the results shows the higher resistance to the temporary poison $H_2O$ of the catalyst based on Cu-tungstate with respect to the catalyst consisting of $WO_3$, the carrier being the same.

EXAMPLE 8

Propylene was disproportioned by using a catalyst based on Cu-tungstate on silica as catalyst carrier at 5% of activated part and a Cu/W atomic ratio of 1:1. The catalyst was obtained according to the method of the preceding examples, starting from 2.0 g. of $Cu(NO_3)_2 \cdot 3H_2O$, 2.1 g. of $5(NH_4)_2O \cdot 12WO_3 \cdot 5H_2O$ and 112 g. of silica "Ludox" sol AS–40. By working at 550° C., atmospheric pressure and a propylene flow of 30 cc./min., the Table 9 data were obtained, they being expressed as weight percentage.

TABLE 9

| $C_2H_4$ | 14.9 |
|---|---|
| $C_3H_8$ | 0.5 |
| $C_3H_6$ | 58.0 |
| 1 $C_4H_8$ | 1.0 |
| 2 $C_4H_8$ trans | 14.3 |
| 2 $C_4H_8$ cis | 11.3 |
| Percent conversion | 41.2 |

EXAMPLE 9

In the same working conditions, a during test was carried out between a catalyst based on $WO_3$ on silica at 7.6% of activated part obtained as reported on Example 7 and a catalyst based on Cu-tungstate obtained according to Example 6.

The conversion values, at variable reaction times, are reported in Table 10. Moreover, the amount of carbon deposited on the two catalysts and measured by gravimetric way, at the same conditions, equal to 56.6% for the catalyst based on $WO_3$ and to 23.5% for the catalyst based on Cu-tungstate.

TABLE 10

| Time as hours | 23 | 70 | 74 | 84 |
|---|---|---|---|---|
| Cu/W | 48.4 | 42.9 | 42.8 | 38.9 |
| $WO_3$ | 43.2 | 35.9 | 32 | 26.2 |

What is claimed is:

1. A process for disproportionating the olefins characterized in that a stream of an olefin having a C atom number ranging from 3 to 30 is contacted with a catalyst consisting essentially of
    (a) tungsten oxide and an oxide of a metal selected from the group consisting of copper, iron, cobalt and nickel; or
    (b) a tungstate of a metal selected from the group consisting of copper, iron, nickel and cobalt; or
    (c) a mixture of a tungstate of (b) with one or more oxides selected from (a) said catalyst being supported by a silica catalyst support at temperatures ranging between 400 and 700° C. and pressures ranging between 1 and 50 atmospheres, without prior activation of the catalyst.

2. A process according to claim 1 characterized in that said stream of an olefin is contacted with a catalyst consisting essentially of copper tungstate.

3. A process according to claim 1 characterized in that said stream of an olefin is contacted with a catalyst consisting essentially of the tungstate of the metals selected from the group consisting of iron, cobalt and nickel.

4. A process according to claim 3 wherein the catalyst includes an oxide of a metal selected from the group consisting of tungsten oxide, iron oxide, cobalt oxide, copper oxide and nickel oxide.

5. A process according to claim 1 characterized in that the catalyst is employed at a ratio ranging from 1:3 to 5:1 of metal to tungsten.

6. A process acocrding to claim 1 characterized in that the reaction is carried out at temperatures ranging between 450 and 600° C.

7. A process according to claim 1 characterized in that the reaction is carried out at atmospheric pressure.

8. A process according to claim 1 characterized in that the reaction is carried out at a pressure higher than atmospheric pressure.

9. A process according to claim 1 characterized in that the reaction is carried out at a contact time ranging between 0.1 and 60 seconds, the contact time being the ratio between the catalyst bed and the flow rate of the reagents as gases in the reaction conditions.

10. A process according to claim 1 characterized in that the olefin is selected from the olefins having a C atom number ranging from 3 to 12.

11. A process according to claim 10 characterized in that the olefin is propylene.

References Cited
UNITED STATES PATENTS
| | | | |
|---|---|---|---|
| 3,445,541 | 5/1969 | Heckelsberg et al. | 260—683 |
| 3,658,930 | 4/1972 | Kenton et al. | 260—683 |
| 3,268,617 | 8/1966 | Menapace et al. | 260—683.2 |
| 3,536,777 | 10/1970 | Alkema et al. | 260—683 |
| 3,595,920 | 7/1971 | Ellis et al. | 260—683 |

DELBERT E. GANTZ, Primary Examiner

C. E. SPRESSER, JR., Assistant Examiner

U.S. Cl. X.R.

260—683.2